Oct. 16, 1945.  A. F. HICKMAN  2,386,795
SPRING SUSPENSION FOR RAILROAD CARS
Filed Jan. 15, 1941  6 Sheets-Sheet 2

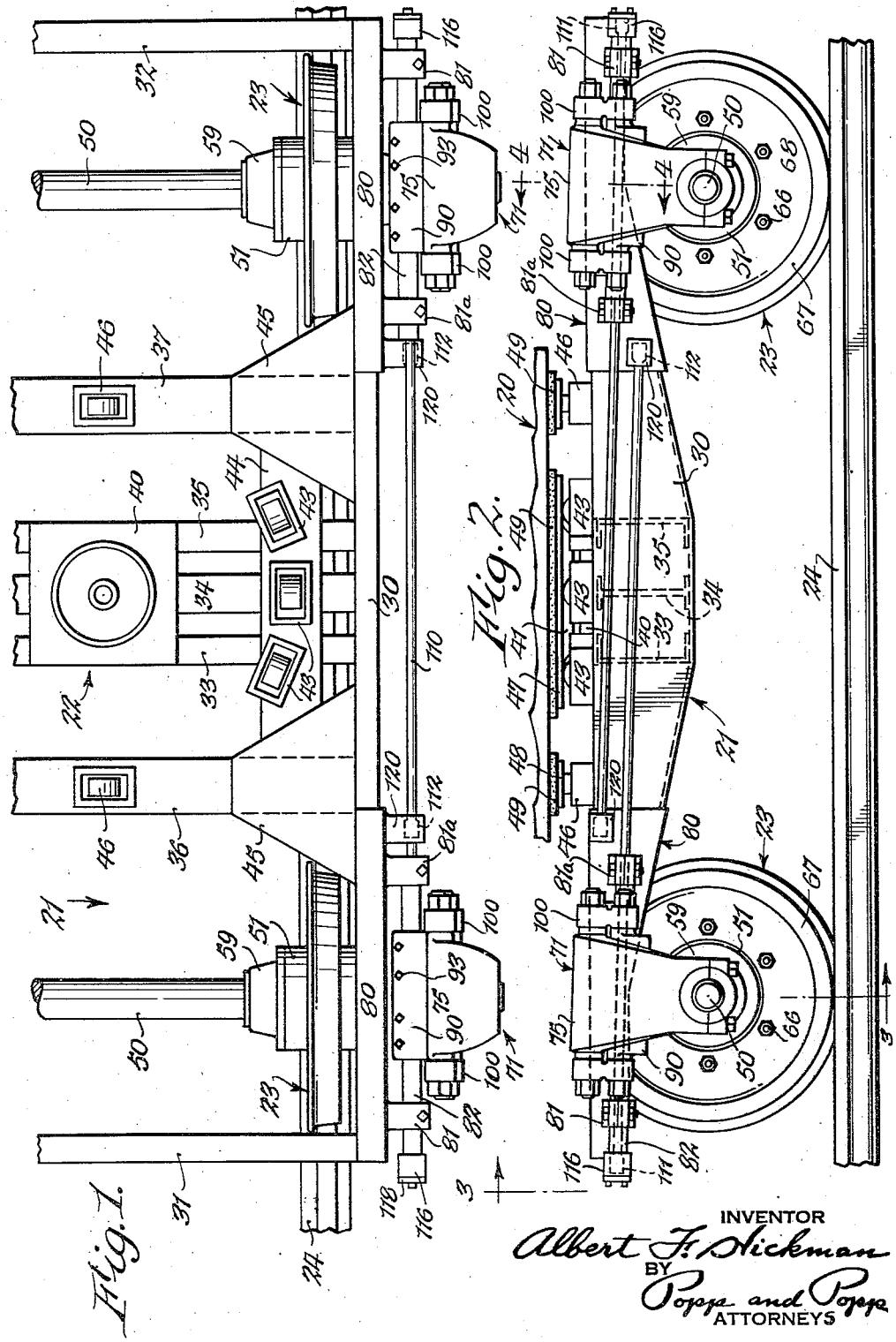

INVENTOR
Albert F. Hickman
BY
Popps and Popps
ATTORNEYS

Oct. 16, 1945.   A. F. HICKMAN   2,386,795
SPRING SUSPENSION FOR RAILROAD CARS
Filed Jan. 15, 1941   6 Sheets-Sheet 3
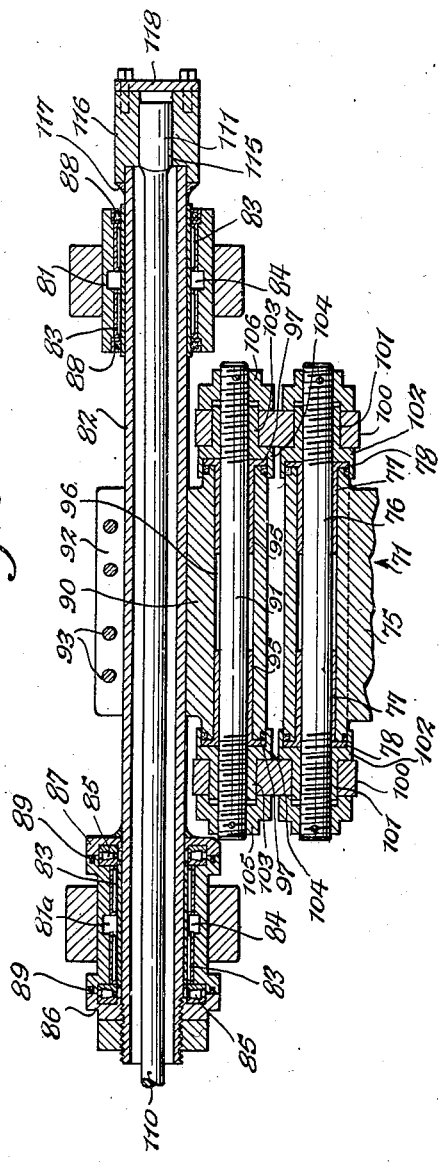
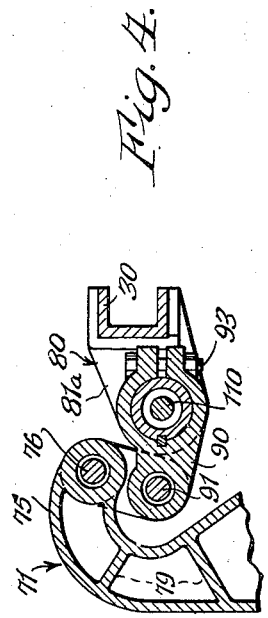
INVENTOR
Albert F. Hickman
BY
Popps and Popps
ATTORNEYS

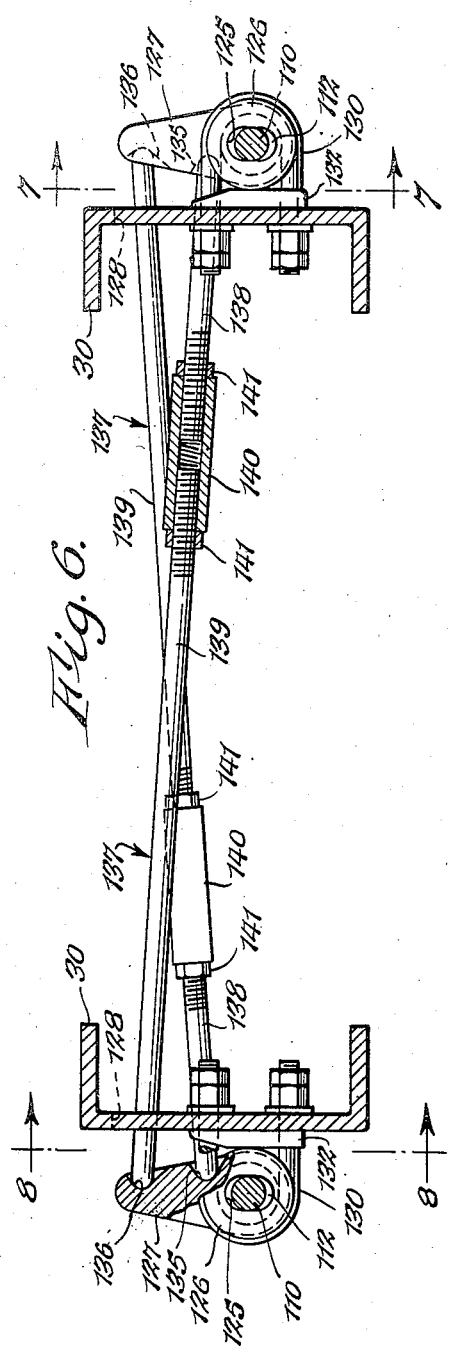

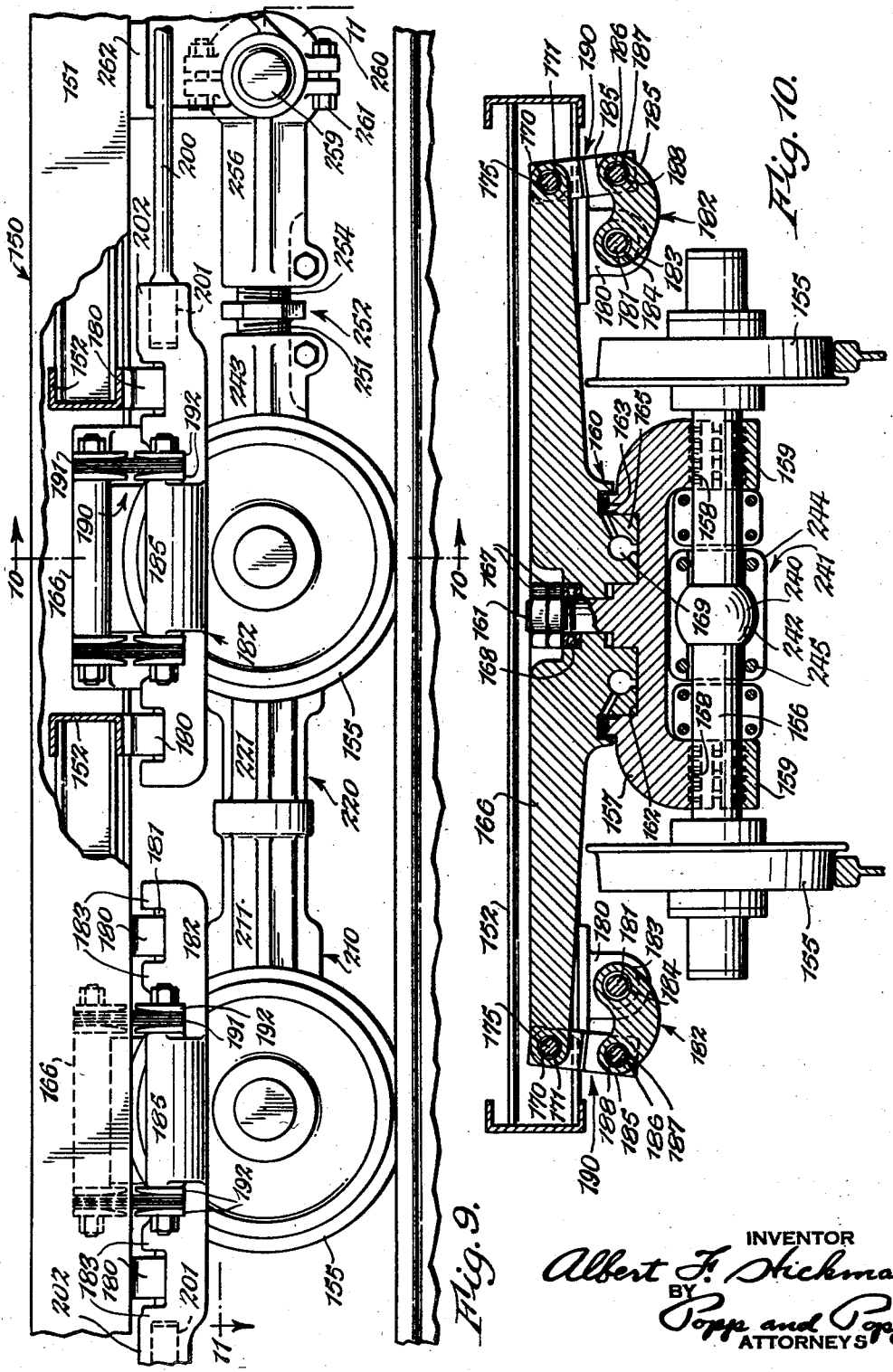

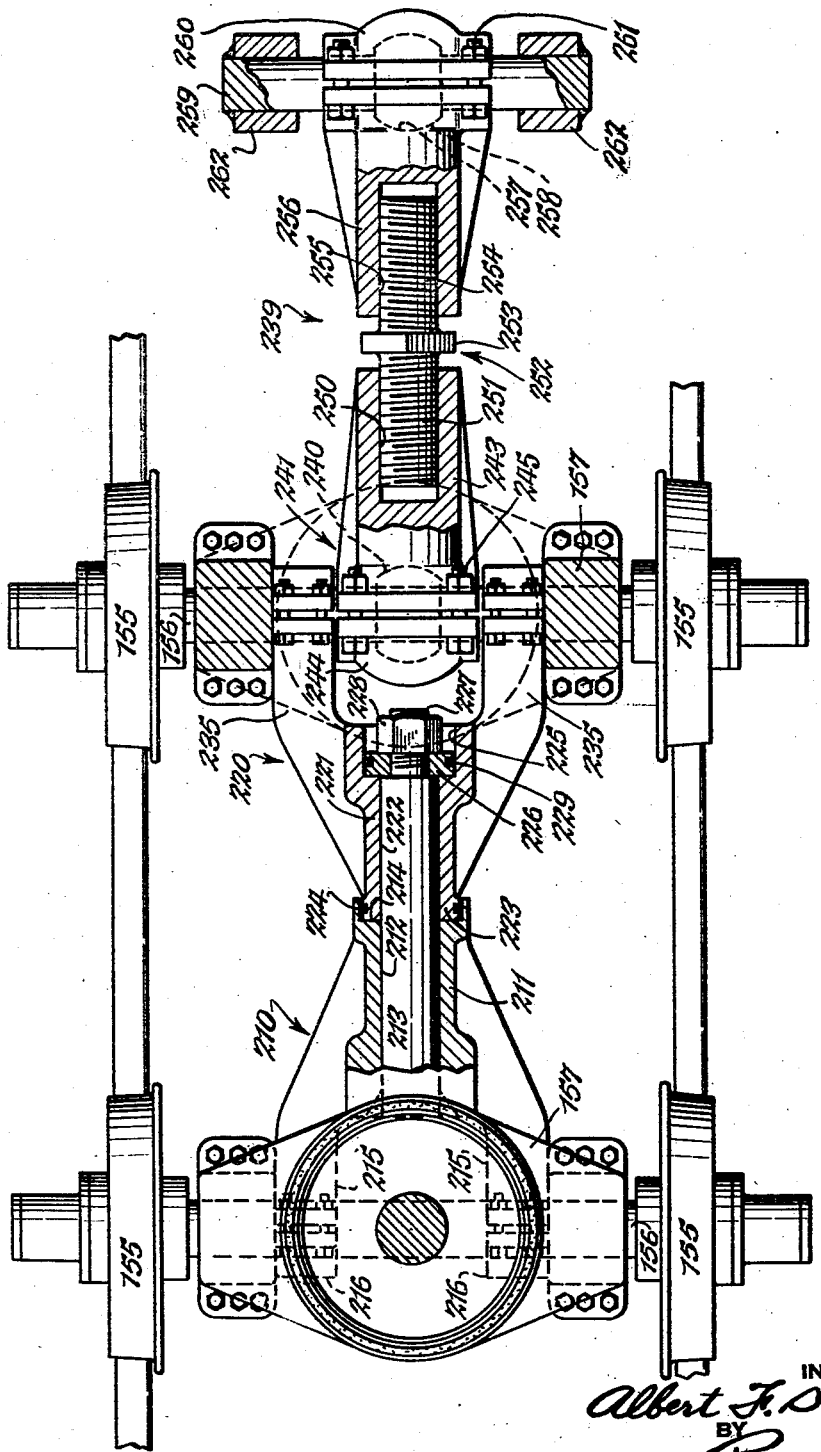

Patented Oct. 16, 1945

2,386,795

UNITED STATES PATENT OFFICE 2,386,795

SPRING SUSPENSION FOR RAILROAD CARS

Albert F. Hickman, Eden, N. Y., assignor to Hickman Pneumatic Seat Co. Inc., Eden, N. Y., a corporation of New York Application January 15, 1941, Serial No. 374,515

11 Claims. (Cl. 105—182)

This invention relates to a spring suspension for railroad cars and more particularly to such a spring suspension particularly adapted for supporting the car of a passenger train where speed of travel, safety, comfort and stability are of prime importance.

This application is a companion to my copending application for Spring suspension for railroad car bodies, Serial No. 374,516, filed of even date herewith, and is a continuation in part of my copending application for Vehicle spring suspension, Serial No. 713,161, filed February 27, 1934, now Patent No. 2,245,585, dated June 17, 1941.

One of the principal objects of this invention therefore is to provide a spring suspension for railroad cars which will function to safely support the car body at the high speeds required in passenger train service, the spring suspension forming the subject of this invention being designed for speeds in excess of 100 miles per hour.

Another object of the invention is to provide such a spring suspension for the cars of passenger trains which has the necessary features of safety both against breakage and also to insure the car being solidly supported on the tracks at all rail speeds.

Another object is to provide such a suspension which has an additional feature of safety in the provision of means for preventing derailment even if a spring should break.

Another object is to provide such a spring suspension for the cars of passenger trains which provides the necessary stability for passenger car service and also provides the desirable comfortable riding qualities.

Another object of the invention is to provide a spring suspension in which both up and down wheel movement is resiliently opposed by a purely geometric resilient resistance instead of an arithmetic or a partially arithmetic and partially geometric resilient resistance.

Another object of the invention is to provide such a spring suspension which provides for the lateral cushioning of the car body as well as its vertical cushioning thereby to absorb lateral impacts imposed upon the car body as well as vertical impacts.

Another object of the invention is to provide such a spring suspension having high and wide spring suspension pivot positions. By the high and wide suspension pivot positions of the present invention stability is increased and the need for anti-body roll devices, such as torsion bar stabilizers, is eliminated. By eliminating these anti-roll devices the same frequencies can be maintained regarding body roll as are developed for vertical movements.

Another object of the invention is to provide such a suspension in which the friction in the spring suspension can be reduced to any desired degree, this object being attained by the use of torsion rods as the resilient means with provision for holding the stress upon these torsion rods low enough to develop extremely long life with very light rods.

Another object of the invention is to provide such a spring suspension which can incorporate large oversized bearings and large grease reservoirs and grease retainers.

Another object is to provide such a spring suspension which does not incorporate axle compensation, axle compensation involving the use of devices to distribute the load to the two or more axles supporting each end of the car. By eliminating axle compensation the weight of the suspension is materially reduced; parts are eliminated; effective spring centers wider than the track can be developed to permit the use of softer springs and thereby obtain improved ride characteristics; and high and wide suspension pivot positions can be employed thereby to obtain increased stability.

Another object of the invention is to provide such a suspension which can be provided with resilient means whereby each axle is permitted to move a slight distance longitudinally of the car body thereby to resiliently resist longitudinal impacts such as occur in applying the brakes or in coupling cars, and in some instances to increase stability by eliminating or preventing wheel tramp or wheel hop.

Another object of the invention is to provide such a spring suspension which is itself light in weight and also is adapted to be used in conjunction with light-weight bodies and equipment, such light-weight bodies and equipment being desirable with the use of increased rail speeds.

Another object of the invention is to provide such a spring suspension which can be used in conjunction with swivel trucks such as are now generally employed to support the bodies of passenger cars.

Another object of the invention is to provide such a spring suspension in which the violent diving of the truck from side to side of the track, particularly at high speed, is eliminated.

Another object of the invention is to provide such a suspension for the swivel truck of a passenger car which permits of the truck being held in fixed relation to the passenger car body except for its swiveling movement around the axis of the king pin, it being unnecessary to permit tilting movements of the truck to take care of conditions, such as the tendency of one wheel to rise off the track, caused by spring breakage. With conventional trucks, which are free to tilt or move up and down independently of the car body, truck diving, wheel tramp, wheel hop and vertical truck frame frequencies are encouraged, especially at high speed.

Another object of the invention is to provide such a swivel truck in which either a center bearing of sufficiently large diameter can be employed to overcome any vertical truck frame frequencies independent of the car body or in which side bearings can be placed both fore and aft of the center bearing as well as at the sides thereof to overcome such vertical truck frame frequencies.

Another object of the invention is to so mount the side bearings as to provide long life for these bearings, a resilient support being provided which retards Brinelling of the bearings and the wearing of flat spots thereon and also providing a desired resilience between these bearings and the truck frame.

Another object of the invention is to provide such a suspension which will support the car body in such manner that zero side sway and even a slight negative sway control can be provided even with the high centers of gravities of conventional passenger car bodies.

Another object of the invention is to provide such a suspension which is adapted for use in conjunction with railroad equipment now in use, thereby permitting of equipping cars now in use with a spring suspension forming the subject of the present invention.

Another object of the invention is to provide a suspension having the foregoing advantages and which can be arranged entirely below the floor of a conventional passenger car.

Another object of the invention is to provide such a spring suspension having many operating economies, such as the saving of fuel; the saving in wear of the tracks and wheels; and the saving in the cost of maintenance of the car bodies.

Another object is to provide such a suspension having roller bearings for the wheels, each of these roller bearings having associated therewith annular emergency bearing surfaces which are normally inoperative but which become operative with any break-down of the roller bearings thereby to avoid any danger of a wreck in the event of a failure of the roller bearings.

Another object of the invention is to provide such a suspension in which the wheels are mounted for independent rotation on the axles thereby to avoid wheel and track wear and secondary flanges which result, to a large extent, through the wheel slippage caused by the wheels being fixed to the axles. Another advantage possible with independent wheel rotation is the reduction of truck diving from side to side at high speeds.

Another object of the invention is to provide such a suspension in which the wheels are of a simple demountable type, easy to change and economical to build.

Another object of the invention is to provide such a spring suspension in which each entire axle assembly can be readily removed as a unit.

Another object of the invention is to reduce to a minimum the unsprung weight of the suspension.

Another object of the invention is to provide such a suspension which eliminates wheel hop and wheel tramp.

Another object is to provide a modified form of the invention in which the axles are not connected to the car body through a swivel truck but the axles are so connected to the passenger car body as to have the same tracking characteristics as if a swivel truck were employed.

Another object of the invention is to provide such a modified form of suspension which has increased resilience and riding characteristics as compared with a suspension including a conventional swivel truck.

Another object of the invention is to provide such a modified form of the invention in which the companion axles are directly and positively connected to each other and to the body of the passenger car by straight thrust members to resist impacts longitudinally of the body.

Other advantages and objects of the invention will be readily apparent from the foregoing description and the accompanying drawings, wherein:

In the accompanying drawings:

Fig. 1 is a fragmentary top plan view of a swivel truck having a spring suspension embodying one form of my invention and adapted to support one end of a passenger car body.

Fig. 2 is a side elevation of the swivel truck shown in Fig. 1 and showing a part of the passenger car body supported thereby.

Fig. 4 is an enlarged, fragmentary, vertical, transverse section taken on line 4—4, Fig. 2.

Fig. 5 is a fragmentary section taken on line 5—5, Fig. 4.

Fig. 6 is a vertical transverse section through the frame of a passenger car and showing the manner in which the dead or anchored ends of a pair of torsion rods supporting the opposite ends of a particular axle can be anchored so that the breakage of one torsion rod will automatically render the companion torsion rod inoperative.

Fig. 7 is an enlarged fragmentary vertical section taken on line 7—7, Fig. 6.

Fig. 8 is an enlarged vertical section taken on line 8—8, Fig. 6.

Fig. 9 is a side elevation of a spring suspension for railroad cars embodying a modified form of the invention.

Fig. 10 is a vertical transverse section taken on line 10—10, Fig. 9.

Fig. 11 is a fragmentary horizontal section taken on line 11—11, Fig. 9.

Figure 3:
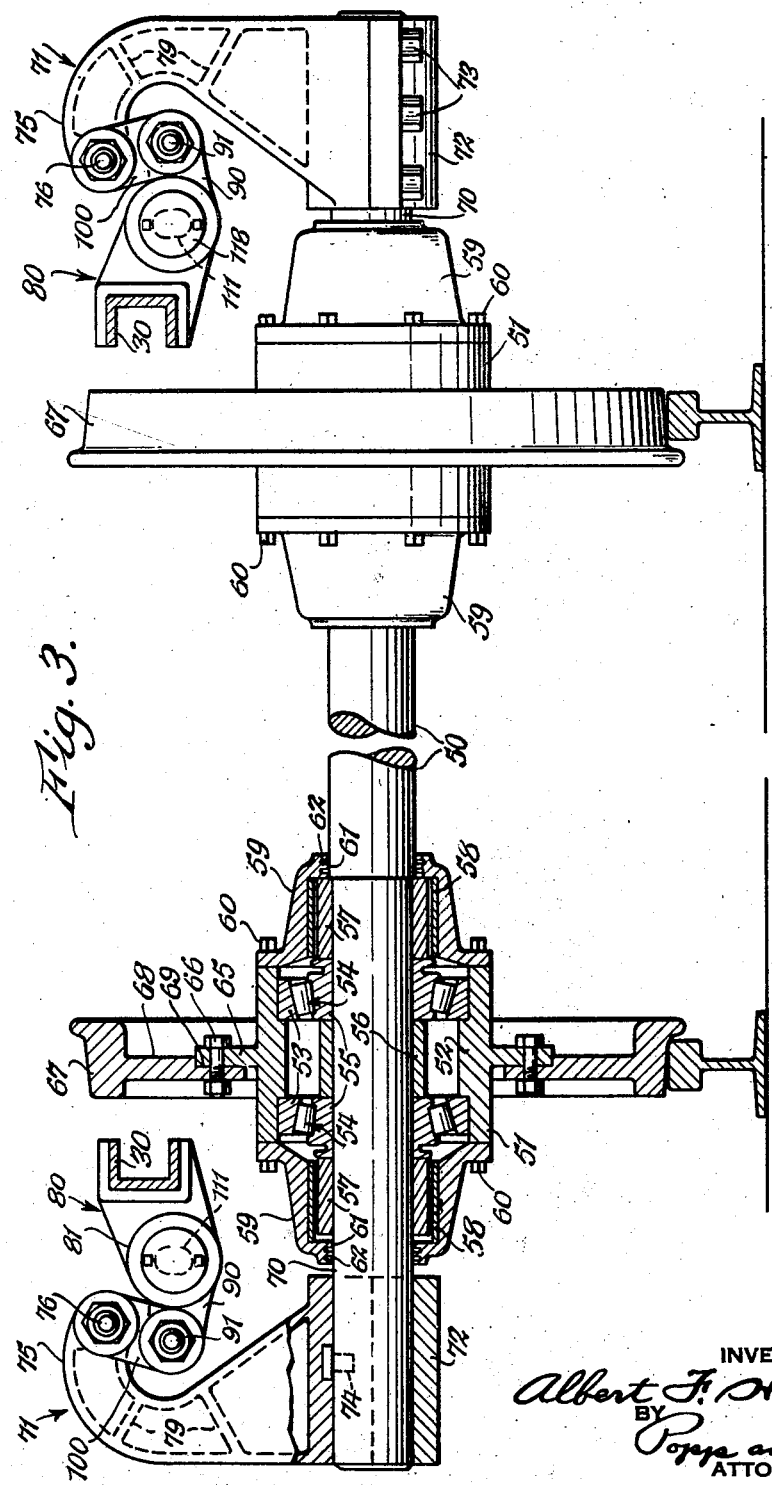
Fig. 3 is a fragmentary vertical section taken generally on line 3—3, Fig. 2 and showing one of the flanged railroad wheels and its bearing in section.

In the form of the invention shown in Figs. 1–5, the passenger car body, indicated generally at 20, is shown as mounted on a swivel truck, indicated generally at 21, by means of a center bearing 22, this truck being shown as supported on four flanged railroad wheels, indicated generally at 23, by a spring suspension embodying one form of my invention. These four flanged railroad wheels of each truck ride upon the rails 24 of the railroad track and the passenger car body 20 is supported at each end on one swivel truck in the usual and well known manner so that each truck supports half the weight of the car body. It will also be understood that while a four wheel truck is shown, the invention can be embodied in a six wheel truck.

The frame of the swivel truck 21 is shown as made of structural steel, although any suitable type of truck frame construction can be employed. The truck is shown as having two longitudinal side beams 30 which are channel shaped in cross section with their flanges extending inwardly, and each of these side beams being relatively deep at its center. These side beams 30 are rigidly connected by transverse end beams 31, 32, three center cross beams 33, 34, 35 and a pair of intermediate cross beams 36 and 37.

The three center cross beams 33, 34, 35 are shown as supporting the lower or truck center bearing plate 40 of the center bearing 22, this truck center bearing plate 40 cooperating with an upper or body center bearing plate 41 to permit the truck to swivel about the axis of the king pin (not shown) which extends through the two center bearing plates. An important feature of the invention is that the center bearing plate can be of unusually large effective diameter, it being feasible to employ center bearing plates having an effective diameter of as much as 24 inches. This is possible because with the spring suspension embodying my invention the truck can be held in fixed relation to the passenger car body except for swiveling about the axis of the center bearing 22 and it is unnecessary to permit tilting movements of the truck to take care of the tendency of one wheel to rise off the track, caused by spring breakage and to take care of truck diving, wheel tramp and wheel hop. To this end, and as optional equipment, three side bearings 43 are shown as mounted on each side of the truck. Each of these side bearings 43 comprises the usual housing containing a single solid roller. Each group of three of these side bearings 43 is shown as mounted on a plate 44 which is carried by the three center cross beams 33, 34, 35 and is secured at its opposite ends to the undersides of reenforcing plates 45 for the ends of the intermediate cross beams 36, 37.

Similar side bearings 46 are also shown as provided as optional equipment in front and in rear of the center bearing 22. As best shown in Fig. 1, these side bearings 46 are shown as mounted at the center of the intermediate cross beams 36 and 37. The rollers of the side bearings 43 and 46 engage metal bearing plates 47 and 48, respectively. These metal bearing plates are secured in any suitable manner to the underside of the body 20 of the passenger car and to provide a limited degree of resilience in these side bearings, each of the metal bearing plates 47, 48 is preferably backed by a sheet of rubber or other resilient material, as indicated at 49. The provision of the side bearings 46 fore and aft of the center bearing 22, as well as the side bearings 43 on opposite sides of this center bearing, eliminates axle compensation effects and truck frame rock frequencies and at the same time obtains the desired ride characteristics and stability. By the provision of the rubber sheets 49 for these side bearings, a good portion of the vertical load can be taken off the center bearing and distributed to the several side bearings both fore and aft and laterally of the center bearing. These rubber backing sheets 49 also eliminate noise and permit freedom for slight vertical movements of the truck frame independently of the car body. The provision of such a rubber mounting for the side bearings also allows for slight looseness in the center bearing connection without causing crosswise movement in any of the rollers of the side bearings. Such crosswise movement of the car body on any of the rollers is apt to result in Brinelling of the flat bearing plates and in flat spots on the rollers. With this resilient form of mounting and with ample size and number of rollers, long life against Brinelling in these side bearings is possible.

The wheels 23 are shown as being mounted for independent rotation at the opposite ends of the axle 50. As best shown in Fig. 3, each wheel preferably comprises a tubular hub 51 having an internal central portion 52 of reduced diameter so as to form opposite shoulders against which the outer races 53 of a pair of taper roller bearings 54 are seated. The inner race 55 of each of these taper roller bearings is held against a spacing sleeve 56 on the axle 50 by an emergency bearing sleeve 57. These auxiliary sleeves are secured to the axle on opposite sides of the wheel assembly and are normally held in spaced relation to corresponding bronze emergency bushings 58 secured in removable tubular hub caps 59 secured to the opposite ends of the tubular hub 51 of each wheel by screws 60 or in any other suitable manner. These hub caps are also preferably formed at their outer ends to provide a seal around the axle 50 which protects the roller bearings against the entrance of dust and dirt. For this purpose, the outer end of each of these hub caps 59 is formed to provide a reduced bore 61 which fits the corresponding part of the axle and this reduced bore 61 of each hub cap is formed to provide oil grooves 62 of any suitable form to maintain an oil seal around the axle 50 at opposite sides of each wheel.

With the emergency bearing sleeves or bushings 57 and 58, it will be seen that in the event of the failure of any of the roller bearings 54, as through a breakdown of one of the rollers, the corresponding pair of emergency bearing sleeves or bushings will come into engagement and form an emergency bearing for that side of the wheel. At the same time, during normal service, these corresponding emergency bearing sleeves or bushings do not engage with each other, as shown in Fig. 3.

The hub 51 is also shown as provided with an integral, annular, radially extending, central flange 65, this flange being provided with an annular series of holes near its rim in which bolts 66 are arranged. The flanged rim 67 of the wheel is formed to provide an inwardly extending annular web 68 which is recessed, as indicated at 69 at one side to receive the peripheral part of the annular flange 65 of the tubular hub 51. The bolts 66 extend through holes provided in the web 68 so that the rim 67 of each wheel is firmly secured to its tubular hub 51.

An important feature of the suspension is the independent rotation of the individual wheels on the axles 50, although the invention is not limited to such independent wheel rotation and is capable of being used with wheels fixed to the axles, as is now standard practice with bearings for the axles. The purpose of the independent wheel rotation is to avoid wheel and track wear, such as causes the development of secondary flanges, caused by wheel slippage on curves and even on straightaways. Wheel slippage also encourages wheel tramp, wheel hop and truck diving, besides consuming additional power directly in proportion to the amount of slippage. It is apparent that such slippage is inherent to wheels which are fixed to a common axle, as on curves especially where one wheel must traverse a greater length of rail than the other. Also, with fixed wheels, at high speeds, the inertia of the axle and wheel assemblies causes flange wear and encourages truck diving because the inertia of these assemblies tends to carry the truck past the correct rolling position of the car wheels. This side to side action of the truck in endeavoring to find the correct rolling position of the wheels results in recurring wheel slippage. This condition is avoided in the employment of wheels having independent rotation around the common axle and in a rigidly constructed truck frame which allows for correct and constant axle alignment.

Each axle 50 is extended at its opposite ends beyond the hubs of its wheels, as indicated at 70. To each of these end extensions 70 of the axles is secured an axle bracket indicated generally at 71. As the axle does not rotate, each axle bracket 71 is provided at its lower end with a socket which receives the upper half of the corresponding end of the axle and this end of the axle is clamped in this socket by a clamping plate 72 having a socket to receive the lower half of the axle and secured to the underside of the bracket 71 by screws 73 or in any other suitable manner. The axle can be prevented from turning in the socket of its axle brackets 71 in any suitable manner as by the pin 74 illustrated in Fig. 3. Each axle bracket 71 flares outwardly from its lower end toward its upper end fore and aft of its lower central point of attachment to the axle, as best illustrated in Fig. 2, and the upper end of this bracket is of goose-neck form, its extreme upper end 75 curving inwardly and then downwardly, and supporting an axle pivot pin 76 which is journaled at its extreme depressed end. This axle pivot pin is shown as being disposed at a slight angle to the horizontal, for a purpose hereinafter set forth, and as extending fore and aft of the truck. As best shown in Fig. 5, the opposite ends of this axle pivot pin 76 are shown as journaled in bronze bushings 77 provided in the ends of the bore which houses the axle pivot pin 76 and the outer end of each of these bushings 77 is shown as provided with an annular end flange 78 which provides an end thrust bearing surface at the front and rear ends of the axle bracket 71. The axle bracket 71 can be suitably strengthened by integral ribs 79 indicated by dotted lines in Fig. 3.

A frame bracket 80 is suitably secured to the side face of each of the longitudinal side beams 30 of the truck frame at each of its ends. These frame brackets 80 serve as the anchorage for the dead ends of the torsion rods which resiliently support the frame of the truck and also serve as means for journaling the live ends of these torsion rods and as a part of the means for pivotally connecting each axle bracket 71 to the truck frame.

For the latter purpose each frame bracket 80 is formed at its front and rear ends to provide a pair of horizontally spaced bearing heads 81, 81a in which a tube 82 is journaled. These bearing heads 81, 81a are arranged so that the tube 82 is arranged at a slight angle to the horizontal and parallel with the corresponding axle pivot pin 76. Each of these bearings heads 81, 81a as best shown in Fig. 5, is shown as carrying a pair of roller bearings 83 which are spaced from each other, and each bearing head is formed to provide an annular lubricant reservoir or chamber 84 between these roller bearings. The bearing head 81a is also shown as provided with a pair of roller thrust bearings 85 at its opposite ends, these roller thrust bearings being interposed between each end of the bearing head 81a and thrust collars 86 and 87, one of which is screwed onto the end of the tube 82 and the other of which is welded to the tube 82. To prevent the escape of lubricant from these bearings, annular lubricant seals 88 of any suitable form are shown as provided in the opposite ends of the bearing head 81 around the tube 82 and similarly annular lubricant seals 89 are shown as provided between each bearing head 81a and each of the thrust collars 86 and 87.

To the tube 82 is clamped a lever or arm 90 which projects horizontally outward from the tube 82 and carries a pin 91 at its outer end, this lever arm pin 91 being arranged parallel with the corresponding axle pivot pin 76 and tube 82 and hence being disposed at a slight angle to the horizontal. This arm is of substantial length lengthwise of the tube 82 and its pin 91, and is shown as being split or bifurcated, as indicated at 92, to embrace and clamp around the tube 82. The free ends of the split or bifurcated portions of each lever 90 are shown as drawn together into firm clamping engagement with the tube 82 by a series of bolts 93, as best shown in Figs. 4 and 5. The opposite ends of the lever arm pivot pin 91 are shown as journaled in bronze bushings 95 provided in the ends of the bore 96 which houses the lever arm pivot pin 91 and the outer end of each of these bushings 95 is shown as provided with an annular end flange 97 which provides an end thrust bearing surface at the front and rear ends of the lever 90.

The opposite ends of the axle pivot pin 76 and the lever arm pivot pin 91 are connected by a pair of shackles 100. For this purpose these opposite ends of these pivot pins are shown as being threaded and a collar 101, having an inner thrust annular flange 102, is screwed onto each end of the axle pivot pin 76, and a similar collar 103, having an inner annular thrust flange 104, is shown as screwed onto each end of the lever arm pivot pin 91. The flanges of these collars are adapted to engage the corresponding end thrust bearing flanges 78, 97 of the bronze bushings 77 and 95 to prevent displacement of the shackles 100 lengthwise of the truck frame. These shackles 100 are shown as being of the rigid or nonflexible type and each is provided with opposite end bores which fit over the corresponding collars 101 and 103. These shackles are held against the end flanges of these collars by nuts 105 and 106 applied, respectively, to the ends of the axle pivot pin 76 and the lever arm pivot pin 91.

The resilient connection between each end of each axle and the frame of the truck is shown as comprising a torsion rod 110 both the live end 111 and the dead end 112 of which is shown as being deformed or upset, as set forth in my Patent No. 2,213,004, dated August 27, 1940, into ovalled form in cross section. The live end of each torsion rod extends through the corresponding tube 82, as best shown in Figs. 4 and 5 and its ovalled extremity at this live end fits into a similarly shaped bore 115 of a cylindrical head 116 which is fitted around, and can be welded as indicated at 117, to the corresponding end of the tube 82 through which the torsion rod extends. To permit of ready removal of each torsion rod, the end of each cylindrical head 116 is preferably closed by a removable cap 118 which, when removed, permits the ready endwise removal of the torsion rod 110.

Each of the torsion rods 110 is arranged to extend axially through its tube 82 and hence the torsion rods are arranged at a slight angle to the horizontal. The primary purpose of arranging these torsion rods and the pivots 76, 82 and 91 at such a slight angle is to maintain these elements in axial parallelism with one another and at the same time to avoid interference between the torsion rods in anchoring their dead ends. The dead end 112 of each torsion rod is anchored in a boss 120 cast in the frame plate 80 which is on the same side of the truck as that frame plate 80 which carries the live end of the torsion rod. Each of these bosses 120 is provided with an ovalled bore which receives the ovalled dead end of the torsion rod to anchor the dead end against twisting.

In the operation of the form of the invention shown in Figs. 1–5, upward movement of the end of any axle effects, through the corresponding axle pivot pin 76, shackles 100 and lever arm pivot pin 91, an upward movement of the corresponding lever arm 90, this lever arm swinging about the axis of the tube 82 to which it is clamped. This tube 82 is journaled in the pair of spaced bearing heads 81, 81a secured to the truck frame and its swinging movement is transmitted to the cylindrical end head or sleeve 116 which is welded to the tube 82. Since the ovalled live end 111 of the corresponding torsion rod 110 is anchored in the ovalled bore 115 in this end head or sleeve, the torsion rod is twisted, its ovalled dead end 112 being anchored in the corresponding boss 120 of the adjacent frame plate 80. This twisting of the torsion rod 110 thereby yieldingly resists upward movement of the end of the axle and restores the axle to its original position.

It will be seen that when the end of the axle is so forced upwardly relative to the truck frame (or vice versa, when the truck frame is forced downwardly relative to the axle under the influence of momentum), the effective resilient opposing force of the torsion rod 110 increases at a geometric and not an arithmetic rate. This geometric rate is of the accelerated increase type in which increments of vertical movements of the axle are opposed by an accelerated rate of resilient resistance. This is primarily due to the progressive decrease in the effective length of the lever arm 90 as these lever arms swing upwardly and inwardly about the live end 111 of the torsion rod 110 and the tube 82 as an axis of rotation. This action is also influenced by the varying angularity of the shackles 100 and the fact that increments of vertical displacement of the lever arm pivot pins 91 at the outer ends of the lever arms 90 cause accelerated rates of increase in the angular displacement of the torsion rod 110. This latter is due to the fact that increments of vertical movement of the lever arm pivot pin 91 are not proportional to the accompanying increments of angular twist to which its corresponding torsion rod 110 is subjected.

This geometric action also occurs when the end of the axle moves downwardly relative to the truck frame from the normal position shown in Fig. 3. Throughout this particular movement, the geometric action is of the accelerated decrease type, that is, as the axle passes through increments of downward movement, the rate of decrease of the resilient force tending to push said axle downwardly increases. Thus, as the end of the axle moves downwardly from the position shown in Fig. 3, the resilient force tending to push it downwardly decreases at an accelerated rate.

It will also be observed that the suspension is non-bottoming in that the line of pressure derived from the axle and directed against either pin 91 at the outer end of the corresponding lever arm 90 is able to pass through the axis of the lever arm 90. In other words, in the suspension shown each lever arm 90 and its shackles 100 are capable of straightening out so that the pivots 76 and 91 come into line with the axis of the lever arm 90. However, this straightening out of each lever arm and its shackles is resisted by the corresponding torsion rod and since it would take an infinite force to actually straighten the lever arm and shackles out, when so resisted, the suspension is inherently non-bottoming. It will also be seen that while the effective resistance of the torsion rods 100 can build up to infinity, they can never be stressed beyond the limited degree of angular movement permitted by the lever arms 90 in approaching a straightened out relation with the shackles 100.

It is to be noted that the shackles 100 of the axle spring suspensions incline upwardly and inwardly from the lever arm pivot 91 to the axle pivot 76. This arrangement has two distinct advantages. One effect of this upward and inward angular shackle arrangement is that it causes the truck at each end of the car body, on which trucks the car body is mounted, to always tend to centralize itself. This centralizing tendency is caused by the effect of gravity which may be considered as a resilient, downwardly acting force acting between the truck and the track bed and operating in a manner identical in its effects to a metal spring connecting the truck and the track bed. It is to be distinctly understood that this force tending to centralize each truck is of a resilient nature. Because of this fact the car body 20 is not subjected to directly connected lateral forces as a consequence of a lateral axle movement. Such a lateral axle movement occurs, for instance, in traversing curves in the track and also when the truck moves horizontally from side to side in centering itself with reference to the track.

In conventional spring suspensions all movements of each axle which are lateral with respect to the truck and car body are transmitted directly to the truck and through links to the car body. Because of the relatively large inertia of the car body and this linkage, such a lateral movement of the axle causes delayed lateral movement of the car body which moves rapidly to one side until it encounters a stop provided on the swivel truck. Because of this delayed lateral movement of the car body, the truck is often starting to move in the opposite lateral direction at the time the body contacts the stop, this resulting in a severe sidewise lurch of the car body. In some conventional railroad car suspensions shock absorbers are incorporated in the suspension to dampen this lurching of the car body but do not, of course, eliminate the cause of this lurching. In my suspension, the axles can move back and forth across the tracks relative to the truck without any direct effect upon the truck and without any noticeable effect on the car body.

While rail cars do not have the high vertical wheel movements caused by rough roads, heavy lateral thrusts do develop when traveling on rails, due to many other causes. With the form of the invention shown in Figs. 1–5, it can be easily noted that all lateral thrusts directed against the axle and wheel assembly are resiliently resisted, except those resulting directly from the weight of the axle, wheels and small axle brackets. In other words, when a train hits a curve at high speed, the weight of the truck will not produce a hammer-like blow against the wheels when the wheels are suddenly caused to move laterally. The wheels will start to move laterally and when the resiliently applied lateral pressure builds up high enough to turn the truck and move the car laterally, the truck and car are moved as a result of a resilient force and not that of a hammer blow.

Another important advantage obtained by the angular arrangement of the shackles 100 is that it reduces the possibility of wheel tramp. This latter may be broadly defined as a periodic vibration of the axle in a vertical transverse plane, the definition being usually limited to a rotary movement about an axis of rotation located at some point in the axle. In general it may be said that if one wheel is lifted, and if this movement causes a downward thrust on the opposite wheel, then wheel tramp results. Such wheel tramp is prevented in the present invention by insuring that the downward thrust of the axle pivot 76 lies at or outside of the vertical plane intersecting the contact of the wheel with the track. It will be noted that by arranging the linkage of the present spring suspension outside of the wheels, the downward thrust of each axle pivot 76 is well outside of the track. Therefore the vertical upward thrust against one wheel is opposed by a directly opposite force passing through the corresponding axle pivot 76 and hence no downward thrust is imposed upon the opposite wheel.

It will also be seen that by arranging the linkage of the wheels of the truck, as shown, the effective spring centers or suspension pivot points are at least 25% of the track width outside of the wheels at each side of the truck. This is also true of the other forms of the invention shown as hereinafter described. With such wide effective spring centers, the result obtained when one wheel rises one inch is that there is a spring deflection of one and one-quarter inches. With a conventional truck suspension, with the effective spring centers well within the wheels, when one wheel rises one inch there is a spring deflection of substantialy less than one inch. The suspension of the present invention, by virtue of the wide effective spring centers, which permit of the use of softer springs, provides a marked increase in stability and a marked improvement in ride as compared with conventional trucks.

The high and wide suspension pivot positions of the different forms of the spring suspension forming the subject of the present invention also eliminate the need for anti-body roll devices, such as torsion bar stabilizers and the like. By eliminating these anti-roll controlling means, substantially the same frequencies can be maintained regarding body roll as are developed for vertical movements, thereby to greatly improve the ride characteristics of the suspension. A roll frequency and vertical frequency of around 70 cycles is desirable for optimum ride conditions. Such a frequency of 70 can safely be incorporated in the suspensions forming the subject of the present invention by virtue of the high and wide suspension pivot points which permit of the use of softer springs and through which the body is more nearly suspended than mounted. Anti-roll stabilizers build up spring rates against body roll and are not a cure, but a crutch, for improperly designed suspensions.

It will also be noted that the spring suspension forming the subject of the present invention does not involve axle compensation, that is, the distribution of the load equally to all of the wheels under all conditions of operation. Axle compensation, while a most valuable feature for heavy highway vehicles, is very undesirable in rail equipment, and does not lend for the optimum in stability and ride. While practically all present rail equipment suspensions incorporate axle compensation, in any properly sprung rail vehicle, axle compensation is not necessary or desirable. Axle compensation is undesirable in any vehicle unless the road traveled over is quite irregular—in other words, where one wheel is constantly caused to rise at least an inch or more above its companion wheel, which, of course, is not the case on rails.

Axle compensation decreases the stability of empty rail cars because it automatically produces effective spring centers equal to only one-half of the width of the track against instantaneous or sudden upward thrusts of a wheel. In other words, if a wheel suddenly moves upward one inch, assuming no body movement occurs, only one-half inch of spring deflection results. Therefore the resistance to this wheel movement is only one-half inch of spring deflection at its given rate, and the energy stored to return said wheel is only that resulting from one-half inch of spring deflection.

Assuming the same spring rate per inch, as previously stated, with my present suspension, when one wheel rises one inch there is a greater spring deflection than the wheel rise—in the order of one and one-quarter inches. As previously stated, such greater spring deflection is desirable to produce the desired ride and stability and as such spring deflections cannot be obtained with axle compensation, axle compensation is undesirable. Also, such greater spring deflection produces a greater resistance to the wheel and axle displacement.

With the arrangement of the lever arm 90, lever arm pivot pin 91, shackles 100 and axle pivot pin 76 as shown, it will be seen that the line of pressure derived from the axle and directed against the lever arm pivot pin 91 is able to pass through the axis of rotation of the lever arm 90. In other words, the lever arm and its shackles are capable of straightening out. This provides a non-bottoming suspension since as the lever arm and shackles approach this straightened out position, the resilient resistance imposed by the torsion rod approaches infinity.

It will be also noted that all brake torque is resisted by the axle brackets, shackles, lever arms and their connecting pivots. Thus, by the wide spacing of the bearing heads 81, 81a, and the bearings 85 for each pivot pin 91 and the bearings 77 for each pivot pin 76, it will be seen that all brake torque is resisted directly by the linkage which connects each end of each axle with the car body and is not transmitted to the torsion rods 110.

It is also to be noted in the present invention that the means whereby resilience is effected does not involve any frictional resistance such as occurs in the case of a conventional leaf spring, and hence is free and non-energy absorbing in its action. Also, having no frictional resistance, except bearings, which afford no particularly difficult lubrication problems, it does not vary because of change of frictional resistance as in the case of the conventional leaf spring.

By the provision of independently rotatable wheels a large amount of wheel wear, such as causes the development of secondary flanges and resulting to a great extent from wheel slippage on curves and even straightaways, is avoided. When a pair of wheels is fast to a common axle wheel slippage is bound to occur, of course, on curves. Wheel slippage also encourages wheel tramp or wheel hop, besides consuming additional power directly in proportion to the amount of slippage. It will also be seen that the wheels shown are of a simple demountable type, easy to change and economical to build.

With the wheel as shown, in the event of the failure of any of the roller bearings 54, the normally inoperative bronze emergency bearing surfaces 57 and 58 will come into action and serve to prevent the possibility of a serious wreck.

As in the present invention all forces, both vertical and horizontal, are resiliently resisted by structure between the axles and the truck frame, the truck frame can be held in fixed relation to the car body except for swiveling movement about the axis of the king pin. This permits of the use of a center bearing 22 of exceptionally large diameter as well as of the use of side bearings arranged fore and aft of the center bearing as well as on opposite lateral sides thereof.

The linkage forming the subject of the present invention is so designed that the torsion rods 110 are not subjected to stresses approaching more than one-half their elastic limits and therefore there is little danger of these torsion rods breaking. It will be appreciated, however, that a torsion rod may be produced with a flaw or other imperfection which will cause it to break in service. Particularly with the arrangement of the invention with the load of the body carried outside of the car wheels, it is desirable that when one torsion rod breaks, its companion torsion rod at the opposite end of the axle be instantly rendered completely inoperative so that the axle becomes springless at both ends instead of merely at one end. In the absence of such provision for rendering the opposite torsion rod instantaneously inoperative, the axle would be unsprung at one side and sprung at its opposite side which would tend to raise the wheel at the end of the axle with the broken spring up off the rail and thereby possibly cause derailment of the particular axle effected, which might possibly result in derailment of the entire car. This condition would be the same in conventional trucks with an enlarged center bearing or with a truck mounting not permitting truck frame vertical freedom in relation to the car body.

In Figs. 6-8 is shown an arrangement for interconnecting the anchorages for the dead ends of the torsion rods at opposite ends of an axle so that if one of these torsion rods breaks the other torsion rod is instantly rendered inoperative. This makes possible and safe the use of a large center bearing with or without the side and end bearings and which in my suspension prevent vertical truck frame movements and frequencies in relation to the car body.

Instead of the anchoring bosses 120 in the form of the invention shown in Figs. 1-5, the dead end 112 of each torsion rod is shown as anchored in the ovalled bore 125 in the hub 126 of a short lever arm 127. Each lever arm is suitably mounted on the longitudinal side beams 30 of the truck immediately under an opening 128 provided in the side beam of the truck by means of a pair of U-bolts 130 which embrace grooved ends 131 of the hub 126 and hold the hub in contact with a bearing plate 132 with sufficient looseness that the lever arm 127 is permitted to rotate when released.

Each of these lever arms 127 projects upwardly and is provided on its inner side with an inner socket 135 and an outer socket 136, these sockets being of rounding form.

A pair of adjustable crossed compression bars or rods 137 are shown as interposed between the two arms 127 associated with each axle. These compression rods or bars are shown as comprising two sections 138 and 139 which are reversely threaded at their opposing ends, these threaded ends being connected by an adjusting sleeve 140 which is also oppositely threaded at its opposite ends to fit the threads of the sections 138 and 139. It will be seen that by turning the adjusting sleeve the effective length of the compression rod or bar 137 can be adjusted. Such adjustment can be maintained by lock nuts 141 provided at the opposite ends of the sleeve 140.

The opposite ends of the compression bars or rods 137 are rounded to fit the recesses 135 and 136 in the arms 127. One end of each compression bar fits in the lower socket 135 of one of the arms 127 and in the outer socket 136 of the opposite arm 127. Similarly, the rounding ends of the companion compression bar or rod 137 are arranged in the other pair of inner and outer sockets of the two arms 127.

When the torsion rods 110 are stressed due to the load imposed on each torsion rod in the form of spring suspension shown in Figs. 1-5, the torsion rods are stressed in opposite directions. That is, the dead end 112 of the torsion rod 110 shown at the left of Fig. 6 is urged to turn or twist in a clockwise direction and the corresponding arm 127 is also urged to rotate in this same direction or inwardly with respect to the truck frame; whereas, the dead end of the torsion rod shown at the right of Fig. 6 is urged to turn or twist in a counterclockwise direction and its corresponding arm 127 is thereby urged to rotate in this same direction or inwardly with respect to the truck frame. It will therefore be seen that the arms 127 are urged inwardly toward each other.

In order to prevent movement of each torsion rod 110 relative to the truck frame and to maintain the levers 127, under varying conditions of loading on each torsion rod 110, in the position of these arms shown in Fig. 6, the compression bars or rods 137 are crossed in such manner that one end of each compression bar engages with one of the arms 127 at a point where the effective lever arm length of the compression bar is comparatively short at one end of the compression bar where the bar engages the inner recess 135, this short lever arm length being the perpendicular distance between the longitudinal axis of the compression bar and the axis of rotation of the corresponding arm 127. The opposite end of the same compression bar engages the outer recess 136 in the arm 127 on the opposite side of the truck frame so that the effective lever arm length of any force transmitted by the compression bar at this end is comparatively longer than the effective lever arm length at the opposite end of the compression bar. This longer effective lever arm length is determined by the perpendicular distance between the longitudinal axis of the compression rod, assuming that the force is transmitted along the longitudinal axis of the compression rod, and the axis of rotation of the corresponding arm 127. It will therefore be seen that while the compression rod transmits the same force from one arm 127 to the arm 127 on the opposite side of the truck frame, the effective turning moment at the end of the compression rod engaging the inner recess 135 in one arm 127 is smaller in magnitude than the effective turning moment at the opposite end of the compression rod which opposite end engages with the outer recess 136 in the opposite arm 127. By crossing the compression rods 137 at the dead ends of the torsion rods in the above manner it is apparent that the arms 127 tend to maintain the same relative positions shown in Fig. 6.

In the event that one of the companion torsion rods 110 shown in Fig. 6 should break the above compression bar arrangement instantaneously renders the companion torsion rod inoperative. Assuming the torsion rod 110 shown at the right in Fig. 6 breaks for any reason, the load directly imposed upon this torsion rod by the sprung weight is, of course, removed. In this event the forces being transmitted by the compression rods 137 from the torsion rod on the left side find no resistance and the right arm 127 is thrown outwardly or rotated in a clockwise direction away from the truck frame. At the same time the opposite arm 127 is not restrained from turning about its axis in the direction urged by the load imposed upon the left torsion rod and this direction, as previously pointed out, is in a clockwise direction or inwardly with respect to the truck frame. This left arm is permitted to swing in this clockwise direction through the opening 128 in the corresponding longitudinal side beam 30 to an inoperative position. It will therefore be seen that with the above linkage arrangement when a torsion rod on one side of the car truck breaks the torsion rod on the opposite side of the truck is rendered instantaneously inoperative thereby to prevent any raising of the opposite wheel which might result in derailment of the passenger train.

In the spring suspension shown in Figs. 9 to 11, the axles are not connected to the passenger car body through a swivel truck but the axles are so connected to the passenger car body as to have the same tracking characteristics as if a swivel truck were employed.

In the form of the invention shown in Figs. 9-11, the underframe 150 is shown as comprising side sills 151 of any suitable form connected by body bolsters 152.

The car wheels 155 are shown as being mounted for independent rotation on the axles 156 which support the underframe. These wheels can therefore be constructed similarly to the wheels of the form of the invention shown in Figs. 1-5.

Each axle is shown as supporting a rigid bolster 157 of arching form which bolster extends transversely of the car body and has each of its ends formed to provide a socket 158 which fits around the upper half of the axle 157 just inside of the adjacent wheel 155. These ends of each axle are firmly clamped in these sockets 158 by half round clamping blocks 159 which engage the underside of the axle and can be bolted or otherwise secured to the rigid bolster 157.

On its upper side each rigid bolster 157 is centrally formed to provide the lower half of a center bearing 160, the bolster being formed to provide a king pin 161 which is threaded at its upper end and is surrounded by an annular recess 162 and an annular oil seal 163. The upper male part 165 which fits into the annular recess 162 is formed in the lower central part of a swing bolster 166 which extends transversely of the car body over and well beyond the car wheels 155. This swing bolster 166 is rotatably secured to the rigid bolster 157 by nuts 167 applied to the king pin 161 and bearing against a thrust roller bearing 168 provided in the upper part of the swing bolster. Oil can be supplied to the center bearing 160 from an annular oil reservoir 169 in the male part 165 of the center bearing 160.

Each end of each swing bolster 166 is formed to provide a horizontal bore 170 which extends lengthwise of the car body and is provided at its ends with widely spaced bearings 171 which support the opposite ends of an axle pivot pin 175.

To connect each end of each swing bolster 166 with the underframe 150 of the car body, a pair of body brackets 180 are secured to the undersides of the body bolsters 152 adjacent each wheel 155, these brackets being spaced from each other a substantial distance lengthwise of the car body and supporting a horizontal body pin 181 which extends parallel with the axle pivot pin 175. On this body pin 181 is journaled a lever or arm 182, this lever arm being of substantial length, lengthwise of the body, and being shown as having four spaced hub portions 183 arranged on opposite sides and immediately adjacent to the pair of body brackets 180 and each provided with a bushing 184 having bearing engagement with the body pin 181 carried by these body brackets. The lever arm 182 is formed at its center to provide a horizontal outward extension 185 which is also of substantial length, lengthwise of the body, and is provided with a horizontal bore 186 in the opposite ends of which widely spaced bushings 187 are mounted, a lever arm pivot pin 188 being journaled in these bushings. This lever arm pivot pin extends parallel to the body pin 181 and the axle pivot pin 175.

The opposite ends of the lever arm pivot pin 188 and the axle pivot pin 175 are connected by flexible shackles 190. These shackles can be of any suitable construction, such shackles being shown in greater detail in my copending application Serial No. 330,735, filed April 20, 1940, for Shackle for spring suspension. As here shown, each shackle comprises a plurality of laminated metal strips 191, the opposite ends of which are arranged between a pair of shackle heads 192. Each shackle is provided with through openings at its opposite ends which fit over the corresponding ends of the axle pivot pin 175 and the lever arm pivot pin 188. By the laminated form of these flexible shackles 190, the shackles yield to permit longitudinal movement of these pivot pins 175 and 188 with reference to each other and these shackles are also capable of twisting to permit slight rotative movement of these pins 175 and 188 in horizontal planes with reference to each other.

The resilient connection between each end of each axle and the underframe is shown as comprising a torsion rod 200, the live end 201 of which is shown as being deformed or upset, as with the torsion rods in the form of the invention shown in Figs. 1-5. To operatively connect the live ends 201 of the torsion rods with the axles, the remotely opposite ends of each pair of lever arms 182 are each formed to provide an end socket extension 202 having an ovalled socket in which the ovalled live end 201 of a corresponding torsion rod 200 is fitted, this ovalled socket and hence the corresponding torsion rod being axially in line with the body pin 181 around which the lever arm 182 fulcrums. It will therefore be seen that the torsion rods 200 supporting the same ends of a pair of axles extend in opposite directions from these axles. The dead ends (not shown) of these torsion rods can be anchored to the underframe in any suitable manner, such as in the manner shown in Figs. 1–5 or 6–8.

To hold each pair of axles 156 in parallel relation to each other at all times, and at the same time to permit these axles to twist relative to each other about a central axis extending transversely of the axles, the axles are connected by a pair of jointed yokes which are shown as constructed as follows:

One of these yokes 210 is shown as comprising a central enlarged portion 211 which is formed to provide an enlarged bore 212 which extends lengthwise of the car body. In this bore 212 is secured, in any suitable manner, an enlarged rod 213, this enlarged rod extending horizontally outward from the end of the enlarged portion 211. Around this projecting end of the enlarged rod 213, the enlarged portion 211 of the yoke 210 is formed to provide a recessed thrust bearing face 214. The yoke 210 is also formed to provide two side arms 215 which project outwardly from the enlarged portion 211 in the opposite direction from the enlarged rod 213 and each of which arms is formed at its end to provide a socket to clamp against the side of the corresponding axle 156. These arms 215 engage the axle just inside of the ends of the rigid bolster 157 and the ends of the axle are securely clamped in these sockets by half round clamping heads 216 which can be bolted to the ends of the arms 215 to clamp the axle therebetween.

The yoke 220 for the companion axle 156 is also shown as having a central enlarged portion 221 which is formed to provide an enlarged bore 222 which receives the projecting end of the enlarged rod 213. The end 223 of the enlarged portion 221 is also formed to provide a thrust bearing extension which fits into and bears against the recessed thrust bearing face 214 of the yoke 210. Preferably an annular oil seal 224 is also provided for the thrust bearing so provided. The opposite end of the enlarged portion 221 of the yoke 220 is also recessed, as indicated at 225, to receive a thrust head 226, this thrust head being screwed over the reduced threaded end 227 of the enlarged rod 213 and being held in place by a lock nut 228. An annular oil seal 229 is also preferably provided between the thrust head 226 and the recess 225.

The yoke 220 is also formed to provide a pair of side arms 235, which are similar to the side arms 215 of the yoke 210, and each of which is similarly formed at its ends to provide a socket to clamp against the axle 156 which is a companion to the axle engaged by the yoke 210. These arms 235 engage the companion axle just inside of the rigid bolster 157 and the ends of the axle are securely clamped in these sockets by half round clamping heads in the same manner as with the arms of the yoke 210.

With the companion pair of axles 156 connected by the yokes in the manner described, it will be seen that the two axles are held in fixed relation to each other except that the axles are free to rotate relative to each other about the axis of the enlarged rod 213 which also intersects the axes of the axles.

In order to transmit impacts longitudinally of the car body from the underframe 150 to the connected pairs of axles and vice versa, a radius rod 239 is interposed between one axle 156 and the underframe 150. For this purpose, this axle is provided with a central spherical head or ring 240 which forms the male part of a universal joint indicated generally at 241. This spherical head fits into a spherical recess 242 provided in the end of a large cylindrical thrust rod 243 and also in a similar spherical recess in a cap 244 which is secured by bolts 245 or in any other suitable manner to the end of the large cylindrical thrust rod 243.

The opposite end of the large cylindrical thrust rod 243 is provided with an axial threaded bore 250 which receives one end 251 of an adjusting screw 252, this adjusting screw being formed to provide a central squared portion 253 by means of which the adjusting screw can be turned. The other end 254 of this adjusting screw 252 is screwed into a bore 255 in a large cylindrical thrust rod 256, the opposite end of which is formed to provide a spherical recess 257 which fits against one side of a central ball 258 provided on a cross rod 259. This recess is held in engagement with this ball by a cap 260 having a spherical recess which fits the other side of the ball 258 and held in place by bolts 261 or in any other suitable manner. The ends of the cross rod 259 can be secured to the underframe 150 in any suitable manner as by being welded to brackets 262 which form a part of the underframe.

The opposite ends of the adjusting screw 252 are, of course, oppositely threaded so that upon turning this adjusting screw the effective length of the radius rod 239 can be adjusted.

In the operation of the form of the invention shown in Figs. 9–11, upward movement of the end of any axle effects an upward movement of the corresponding sides of the rigid bolster 157 and the swing bolster 166. In this movement, the movement of any one axle is independent of the movement of its companion axle inasmuch as the axles are free to turn relative to each other about the axis of the enlarged rod 213, the thrust bearing surfaces 214 and 225 permitting such relative movement of the axles. The upward movement of one end of the swing bolster 166 effects, through the corresponding axle pivot pin 175, shackles 190 and lever arm pivot pin 188, an upward movement of the corresponding lever arm 182, this lever swinging about the axis of the body pin 181 as an axis. This lever arm 182 is formed at its end 202 to provide the ovalled socket in which the live end 201 of the corresponding torsion rod 200 is anchored and this movement of the lever arm 182 thereby effects a twisting of the torsion rod. This twisting of the torsion rod 200 thereby yieldingly resists upward movement of the end of the axle and restores the axle to its normal position.

It will further be seen that since the underframe 150 is connected to the ends of the swing bolsters 166 by the shackles 190 which are pivotally mounted on the pin 175 and 188 which extend longitudinally of the car body, the car body can move laterally of the axles when subjected to lateral impacts, as when traversing a curve of the track. Further, it will be noted, as with the form of the invention shown in Figs. 1–5, that these shackles extend upwardly and inwardly from the lever arm pins 188 to the axle pins 175 and that therefore the body is self-centering through the resilient force of gravity acting upon the car body. It will therefore be seen that in the general arrangement of the parts the operation of and the advantages attained by the spring suspension shown in Figs. 9-11 is the same as with the form of the invention shown in Figs. 1-5 and the detailed discussion of these operating effects is therefore not repeated.

The construction shown in Figs. 9-11, however, is such that although the axles are not connected to the passenger car body through a swivel truck, the connection is such that the axles have the same tracking characteristics as if the swivel truck, as shown in Figs. 1-5, were employed. The provision of such car truck characteristics in the form of the invention shown in Figs. 9-11 is dependent upon the provision of an individual center bearing for each axle and the provision of the flexible shackles 198 which permit a limited independent movement of each end of each axle swing bolster lengthwise of the car body.

On entering a curve it is necessary that the axles move with reference to the car body to negotiate the curve. Since the axles are held in fixed parallel relation to each other by the yokes 210, 220 (except for their movement in vertical planes about the longitudinal axis of these yokes, which movement does not enter into the problem under consideration), the movement of the parallel pair of axles to an angular position with reference to the car body to negotiate the curve is permitted by the center bearing 168 between each axle and the corresponding swing bolster 186 and also by the flexible shackles 198 which permit these swing bolsters to move toward and from each other the slight requisite amount to permit the connected axles to assume an angular position with reference to the swing bolsters. Thus, the swing bolsters are free to move transversely of the car body independently of each other but are held in substantially fixed parallel relation by the shackles. The axles are also held in parallel relation to each other by their connecting yokes. When a curve is encountered, the axles move to an angular position relative to the car body, each turning slightly relative to its swing bolster 186 and moving its swing bolster laterally in a corresponding direction. The swing bolsters are necessarily drawn together a slight distance during this movement, this being permitted by the flexible shackles which connect the swing bolsters with the car body.

By the "vertical plane of the annular line of contact of the car wheel with the track" as used in the accompanying claims, is meant the vertical plane intersecting that annular line on the periphery of the car wheel which contacts with the track as the wheel rolls along the track.

From the foregoing it will be seen that the present invention provides an independent axle spring suspension for railroad passenger cars which provides the desirable ride characteristics, especially at high speed, and at the same time provides the necessary stability. It will further be seen that the present invention provides a suspension which is light in weight and will function to provide improved ride characteristics with little attention or danger of breakdown.

I claim as my invention:

1. A spring suspension for a railroad car body, comprising a swivel truck supporting each end of said body, a pair of axles at opposite ends of said swivel truck, a car wheel supporting each end of each of said axles, a pair of torsion rods arranged one above the other in a vertical plane at each side of said truck and extending lengthwise of the car body, means for anchoring one end of each of said torsion rods to said swivel truck, means for rotatably supporting the opposite end of each of said torsion rods on said truck, and means for operatively connecting said opposite end of each of said torsion rods with the corresponding end of one of said axles to resiliently restrain vertical movement of said axles relative to said truck frame, comprising a lever arm operatively connected to said opposite end of each of said torsion rods to rotate about an axis coaxial therewith and projecting outwardly from said swivel truck, a shackle pivotally secured to each of said lever arms and extending upwardly and inwardly therefrom, and means for pivotally securing the upper end of each of said shackles with said corresponding end of one of said axles.

2. A spring suspension for carrying the body supporting frame of a railroad car, comprising an axle, a car wheel supporting each end of said axle, a pair of torsion rods mounted on said frame in parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, and means providing the sole anchorage for the dead end of each torsion rod to prevent rotation thereof relative to said frame, comprising an arm fast to the dead end of each of said torsion rods and extending in a generally vertical direction therefrom, and a pair of cross members connecting the ends of said arms and each connecting the outer extremity of one arm with the inner extremity of the other arm whereby in the event of one of said torsion rods breaking the arm of the other of said torsion rods is released thereby to render both torsion rods completely inoperative if one breaks.

3. A spring suspension for carrying the body supporting frame of a railroad car, comprising an axle, a car wheel supporting each end of said axle, a pair of torsion rods mounted on said frame in parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, and means providing the sole anchorage for the dead end of each torsion rod to prevent rotation thereof relative to said frame, comprising an arm fast to the dead end of each of said torsion rods and extending in a generally vertical direction therefrom to be urged toward the other torsion rod by the load imposed upon its torsion rod, each of said arms being provided with inner and outer bearing surfaces arranged at different distances from the axis of the corresponding torsion rod, a compression member connecting the outer bearing surface of one of said arms with the inner bearing surface of the other of said arms and a second compression member connecting the other pair of said bearing surfaces, said compression members normally substantially preventing the transmission of load from one torsion rod to the other torsion rod and operating to render either of said torsion rods completely inoperative in the event of the other torsion rod breaking.

4. A spring suspension for supporting each end of a railroad car body, comprising a pair of companion axles, a car wheel supporting each end of each of said axles, means connecting said axles to hold them in fixed relation to each other except for rotation relative to each other about a common transverse axis, a swing bolster arranged above each of said axles and arranged parallel thereto, a center bearing between each of said axles and the corresponding swing bolster, and resilient means connecting each of said swing bolsters to said car body.

5. A spring suspension for supporting each end of a railroad car body, comprising a pair of companion axles, a car wheel supporting each end of each of said axles, means connecting said axles to hold them in fixed relation to each other except for rotation relative to each other about a common transverse axis, a swing bolster arranged above each of said axles and arranged parallel thereto, a center bearing between each of said axles and the corresponding swing bolster, resilient means connecting each of said swing bolsters to said car body, and a radius rod extending lengthwise of said car body and connecting said connected pair of axles with said car body.

6. A spring suspension for supporting each end of a railroad car body, comprising a pair of companion axles, a car wheel supporting each end of each of said axles, means connecting said axles to hold them in fixed relation to each other except for rotation relative to each other about a common transverse axis, a swing bolster arranged above each of said axles and arranged parallel thereto, a center bearing between each of said axles and the corresponding swing bolster, resilient means connecting each of said swing bolsters to said car body, a radius rod extending lengthwise of said car body, a universal joint connecting one end of said radius rod with said car body, and a second universal joint connecting the other end of said radius rod with one of said axles.

7. A spring suspension for supporting each end of a railroad car body, comprising a pair of companion axles, a car wheel supporting each end of each of said axles, means connecting said axles to hold them in fixed relation to each other except for rotation relative to each other about a common transverse axis, a swing bolster arranged above each of said axles and arranged parallel thereto, a center bearing between each of said axles and the corresponding swing bolster, a pair of lever arms fulcrumed on each side of said car body to swing about an axis extending lengthwise of said car body, a flexible shackle connecting the free end of each of said lever arms with the corresponding end of each swing bolster, each of said shackles resiliently permitting movement of the corresponding end of said swing bolster lengthwise of said car body, and means for resiliently resisting movement of each of said swing bolsters relative to said car body.

8. A spring suspension for supporting each end of a railroad car body, comprising a pair of companion axles, a car wheel supporting each end of each of said axles, means connecting said axles to hold them in fixed relation to each other except for rotation relative to each other about a common transverse axis, a swing bolster arranged above each of said axles and arranged parallel thereto, a center bearing between each of said axles and the corresponding swing bolster, a pair of lever arms fulcrumed on each side of said car body to swing about an axis extending lengthwise of said car body, each of said lever arms being arranged outside of the annular line of contact of the adjacent car wheel with its rail, a flexible shackle connecting the free end of each of said lever arms with the corresponding end of each swing bolster, each of said shackles resiliently permitting movement of the corresponding end of said swing bolster lengthwise of said car body, and means connecting each of said lever arms with said car body and resiliently resisting movement of each of said lever arms.

9. A spring suspension for carrying the body supporting frame of a railroad car, comprising an axle, a car wheel supporting said axle, a lever arm fulcrumed on said frame and having its free end arranged outside of the vertical plane of the annular line of contact of said car wheel with the railroad track, a pin mounted in the outer end of said lever arm, means for connecting said lever arm pin with said axle so that the line of pressure derived from said axle and directed against said pin is able to pass through the axis of said lever arm fulcrum, and means for resiliently restraining rotation of said lever arm.

10. A laterally cushioned axle mounting between the wheeled axles and frame of a railroad car, comprising an axle bracket mounted on each end of each of said axles to project upwardly therefrom and arranged outside of the vertical plane of the annular line of contact of the adjacent car wheel with its rail, a normally generally horizontal crank arm pivotally mounted on said frame adjacent each end of each axle to swing about a horizontal axis extending transversely of said axle, said crank arm being interposed between the corresponding car wheel and axle bracket, a tension shackle pivoted at its lower end to said crank arm and at its upper end to the upper end of said axle bracket, and spring means connected to said frame and tending to urge said crank arm and its shackle downwardly, said crank arms and shackles permitting cushioned movement of said axles laterally of the car body.

11. A laterally cushioned axle mounting between the wheeled axles and frame of a railroad car, comprising an axle bracket mounted on each end of each of said axles to project upwardly therefrom and arranged outside of the vertical plane of the annular line of contact of the adjacent car wheel with its rail, a normally generally horizontal crank arm pivotally mounted on said frame adjacent each end of each axle to swing about a horizontal axis extending transversely of said axle, said lever arm being interposed between the corresponding car wheel and axle bracket and projecting horizontally outward from its pivotal mounting on said frame, a tension shackle pivoted at its lower end to said crank arm and at its upper end to the upper end of said axle bracket, and spring means connected to said frame and tending to urge said crank arm and its shackle downwardly, said crank arms and shackles permitting cushioned movement of said axles laterally of the car body.

ALBERT F. HICKMAN.